United States Patent
Ishikawa et al.

(10) Patent No.: US 7,226,633 B2
(45) Date of Patent: Jun. 5, 2007

(54) FRACTIONATED SOYBEAN PROTEINS AND METHOD FOR PRODUCING THE SAME

(75) Inventors: Masahiro Ishikawa, Tsukuba-gun (JP); Mitsutaka Kohno, Tsukuba-gun (JP); Yasue Nagao, Tsukuba-gun (JP); Motohiko Hirotsuka, Tsukuba-gun (JP)

(73) Assignee: Fuji Oil Company, Limited, Osaka (JP)

( * ) Notice: Subject to any disclaimer, the term of this patent is extended or adjusted under 35 U.S.C. 154(b) by 504 days.

(21) Appl. No.: 10/381,823

(22) PCT Filed: Sep. 28, 2001

(86) PCT No.: PCT/JP01/08534

§ 371 (c)(1), (2), (4) Date: Mar. 31, 2003

(87) PCT Pub. No.: WO02/28198

PCT Pub. Date: Apr. 11, 2002

(65) Prior Publication Data

US 2004/0028799 A1 Feb. 12, 2004

(30) Foreign Application Priority Data

Oct. 2, 2000 (JP) .............................. 2000-301544

(51) Int. Cl.
A23L 1/20 (2006.01)

(52) U.S. Cl. ...................... 426/634; 426/425; 426/429; 426/430; 426/478; 426/520

(58) Field of Classification Search ................ 426/634, 426/425, 429, 430, 520, 478

See application file for complete search history.

(56) References Cited

U.S. PATENT DOCUMENTS

| 3,721,569 | A | * | 3/1973 | Steinkraus | ................ | 426/430 |
| 4,771,126 | A | * | 9/1988 | Hirotsuka et al. | .......... | 530/378 |
| 4,943,441 | A | | 7/1990 | McCabe | | |
| 6,054,494 | A | * | 4/2000 | Narabe et al. | ................ | 516/56 |

FOREIGN PATENT DOCUMENTS

| EP | 0 072 094 | 2/1983 |
| EP | 1 174 516 | 1/2002 |
| EP | 1 323 425 | 7/2003 |
| JP | 7-203862 | 8/1995 |
| JP | 11-308969 | 11/1999 |
| JP | 2000-191694 | 7/2000 |

* cited by examiner

Primary Examiner—Helen Pratt
(74) Attorney, Agent, or Firm—Wenderoth, Lind & Ponack, L.L.P.

(57) ABSTRACT

A method for fractionating a soybean protein into highly pure 7S globulin and 11S globulin efficiently in an industrial scale is provided, said method comprising warming a solution containing a soybean protein under a weakly acidic condition followed by fractionating at pH 5.6 to 6.6 into a soluble fraction and an insoluble fraction. If necessary, a treatment with a phytase may also be employed in the production method to fractionate into a 7S globulin and a 11S globulin.

9 Claims, 2 Drawing Sheets

● Non-phytate-cleaved 7S globulin
○ Phytate-cleaved 7S globulin

● Non-phytate-cleaved 11S globulin
○ Phytate-cleaved 11S globulin

FRACTIONATED SOYBEAN PROTEINS AND METHOD FOR PRODUCING THE SAME

FIELD OF THE INVENTION

The present invention relates to a method for producing a 7S globulin-rich fraction and an 11S globulin-rich fraction from a solution containing a soybean protein.

PRIOR ART

A depot protein of a soybean precipitates at approximately pH4.5, and can readily be separated into a protein component and non-protein components. This depot protein is referred to as a soybean isolated protein, which is a common form when being utilized in a food industry. A protein is classified based on the sedimentation coefficient upon ultracentrifugation into various globulins including 2S, 7S, 11S and 15S. Among these globulins, a 7S globulin and a 11S globulin are major constituents of a globulin fraction (the terms 7S globulin and 11S globulin are designated based on the sedimentation method, and correspond substantially to β-conglycinin and glycinin which are termed immunologically), and their viscosities, coagulation characteristics and surface activities and the like are different from each other. Accordingly, by fractionating a soybean protein into a 7S globulin-rich fraction and an 11S globulin-rich fraction, the properties of the both proteins become capable of being brought into use, whereby expanding the industrial applicability of the proteins.

While each of the 7S globulin and the 11S globulin has several subunits, the former consists of three subunits, namely α, α' and β and the latter consists of several types of the subunit composed of a pair of an acidic polypeptide (A) and a basic polypeptide (B). With regard to the proportion between the both, the ratio of 7S globulin: 11S globulin, when represented typically as an area ratio of an SDS polyacrylamide gel electrophoresis pattern determined by a densitometry, is about 1:2. With regard to the characteristics of the 7S globulin and the 11S globulin, the molecular weights and the static conditions are very similar to each other. Especially since both globulins are the proteins which are diverse due to various combinations of the subunits, their characteristics vary to some extent and are overlapped by each other. As a result, it is very difficult to accomplish a valid separation of the both without any contamination with each other.

There are several known fractionation methods such as a method utilizing a difference in the isoelectric point wherein an extraction is conducted at a pH near the isoelectric point of a 11S globulin whereby extracting a 7S globulin exclusively (JP-A-55-124457), a method utilizing a difference in the reactivity with calcium wherein a small amount of calcium salt is added upon extraction whereby allowing a 7S globulin-rich fraction to be extracted (JP-A-48-56843), a method utilizing a difference in the solubility at a certain pH or ionic strength including a method wherein an insoluble portion is removed in the presence of sodium chloride or potassium chloride at pH 1.2 to 4.0 to produce a 7S globulin (JP-A-49-31843) and a method wherein an isoelectrically precipitated slurry is adjusted at pH 5.0 to 5.6 and the sodium chloride was adjusted at 0.01 to 0.2M whereby separating 7S and 11S fractions (JP-A-58-36345), a method utilizing a cryoprecipitation and a reducing agent and the like wherein a reduction in the solubility of a 11S globulin at a low temperature (referred to as a cryoprecipitation) is utilized and a soybean protein source is treated in an aqueous system at pH 6.5 or higher in the presence of a sulfite compound, a glutathion compound or a cysteine compound and adjusted at pH 5.5 to 7.0 at 20° C. or lower whereby fractionating into a 7S globulin-rich soluble fraction and a 11S globulin-rich insoluble fraction (JP-A-61-187755).

While each of these known fractionation methods involves an advantageous utilization of the solubility which differs between the 7S globulin and the 11 S globulin at certain pH and ionic strength, in the presence of a certain salt, and at certain temperature and the like, it is rather a laborious method than an industrial method and still involves a problem relating to a practicability, although it enables a fractionation which is distinct to some extent. For example, the method disclosed in JP-A-61-187755 involves the drawbacks relating to the practicability such as a requirement of a cooling to a temperature as low as 5° C. since a cryoprecipitation depends greatly on the temperature and a requirement of an addition of a large amount of a sulfite compound for accomplishing a separation by means of a low centrifugal force employed industrially as well as the drawbacks relating to the fractionation accuracy such as an inevitable migration of a 11 S globulin into a soluble fraction.

For the purpose of obtaining a 7S globulin-rich protein, a genetically-produced 11S globulin-defect soybean, i.e., a 7S globulin-rich seed was attempted to be isolated (Breeding Science, 46, 11, 1996), and its utility (Breeding Science, 50, 101, 2000) and patent (U.S. Pat. No. 6,171,640 B1) can also be found.

As described above, a method for separating a 7S globulin-rich fraction and a 11S globulin-rich fraction by which an mutual migration between soluble and insoluble fractions is reduced and by which a production in an industrial scale is accomplished conveniently and efficiently has been researched and developed.

On the other hand, it was reported by Samoto et al that among soybean-derived proteins there were proteins having high affinities with polar lipids as constituents of a cytoplasmic membrane as well as protein body or oil body membrane (oil-body-associated proteins) which were produced in an amount as high as about 35% of industrially produced fractionated soybean proteins (Biosci. Biotechnol. Biochem., 62 (5), 935–940 (1998)). This oil-body-associated protein is a general term of the proteins consisting mainly of membrane proteins, especially those whose molecular weights measured by an SDS-polyacrylamide gel electrophoresis were 34 kDa, 24 kDa and 18 kDa, and exist as a fraction containing about 10 to 12% by weight of polar lipids which are extractable with a 2:1 polar solvent mixture of chloroform:ethanol.

A conventional fractionation is focusing only on a 7S and a 11S, and pays no attention to the oil-body-associated proteins which are contaminating each fraction, since the oil-body-associated protein can not be identified as positively as the 7S and the 11S when analyzed by an SDS-polyacrylamide gel electrophoresis and is underestimated frequently. In other words, a purity when determined only by an SDS polyacrylamide gel electrophoresis becomes higher frequently than the actual purity, and the behavior of the oil-body-associated proteins should be taken into account for the purpose of obtaining a 7S or a 11S at a really high purity. Thus, a conventional separation into the two fraction 7S/11S handles a purity of a fraction only as a ratio between the 7S and the 11S. However, each fraction is associated with the oil-body-associated proteins, and in many cases its actual state is a relatively crude fraction having a slightly lower purity whose protein composition is characterized by a large amount of the oil-body-associated proteins.

One of the objectives of the present invention is to propose a novel method for fractionating a 7S globulin and a 11S globulin especially in an industrial scale at a high accuracy and a high efficiency. Another objective of the invention is to obtain a protein fraction characterized by a reduced amount of contaminating oil-body-associated proteins and also by a high purity of a 7S globulin or a 11S globulin.

SUMMARY OF THE INVENTION

The present invention is a method for producing a fractionated soybean protein which comprises warming a solution containing a soybean protein under a weakly acidic condition followed by fractionating at pH 5.6 to 6.6 into a soluble fraction and an insoluble fraction. The above-mentioned weakly acidic condition is preferably pH 3.8 to 6.8 and the warming is conducted preferably at a temperature of 30 to 75° C. As a result, a 7S globulin-rich soluble fraction containing a reduced amount of the oil-body-associated proteins can be obtained. Although a 11S globulin-rich insoluble fraction containing an increased amount of the oil-body-associated proteins results from this procedure, its 11S globulin can be extracted in an approximately neutral aqueous solution exclusively as being solubilized while keeping the oil-body-associated proteins still insoluble, whereby obtaining a 11S globulin-rich fraction containing a reduced amount of the oil-body-associated proteins.

The present invention also provides a highly pure 7S globulin soybean protein or a highly pure 11S globulin soybean protein whose phytate content is low by means of decomposing phytate by a phytase during the manufacturing process, which also serves to improve the separation accuracy in a separation process.

A soluble fraction obtained in a production method described above has a ratio of 7S globulin/(11S globulin+7S globulin) of 0.4 or higher, which can be raised to 0.8 or higher, 0.85 or higher or 0.9 or higher by selecting the conditions appropriately, whereby obtaining a highly pure protein very easily. This soluble fraction is also a soybean protein which contains a 11S globulin or proteins other than the 7S globulin only in reduced amounts and which contains the oil-body-associated proteins especially in an amount as low as 10% per total protein solid or less, whereby providing a highly pure 7S globulin in a more strict meaning. Another fraction, i.e., an insoluble fraction has a ratio of 11S globulin/(11S globulin+7S globulin) of 0.7 or higher, which can be raised to 0.8 or higher, 0.85 or higher or 0.9 or higher by selecting the conditions appropriately, whereby obtaining a highly pure protein very easily.

A relative amount of a 7S globulin or a 11S globulin mentioned here means an area ratio based on the pattern of the bands of in SDS-polyacrylamide gel electrophoresis measured by a densitometer (except for a corrected purity described below).

The oil-body-associated proteins, when obtained accurately from an almost non-modified acid-precipitated globulins using sodium sulfate, exist in the acid-precipitated globulins at a concentration of 30% to 35% (Biosci. Biotechnol. Biochem, 62 (5), 935–940 (1998), op.cit.), and this acid-precipitated globulin solid contains 3 to 4% by weight of polar lipids extractable with chloroform:methanol (2:1, v/v) which is present at a level of 10 to 12% also in the oil-body-associated proteins, indicating that the above-mentioned polar lipids (hereinafter sometimes abbreviated as "chloroform-methanol-extractable oil portion") are present predominantly in the oil-body-associated proteins among the acid-precipitated globulins and that the amount of the oil-body-associated proteins can be calculated to be the amount 10 times the weight of the chloroform-methanol-extractable oil portion. This calculation can however be subjected to a material whose oil-body-associated proteins has been defatted for example by hexane, and should be applied to any material which is not extracted with hexane after defatting with hexane. A 7S globulin-rich soluble fraction described above a chloroform methanol-extractable oil portion content of 1% or less according to the present invention, which corresponds to the oil-body-associated proteins at a level of 10% or lower.

Another fraction, i.e., an insoluble fraction has a ratio of 11S globulin/(11S globulin+7S globulin) of 0.7 or higher, and the 11S globulin contained in this insoluble fraction can be extracted in an approximately neutral (pH 6.5 to 8.5) aqueous solution exclusively as being solubilized while keeping the oil-body-associated proteins still insoluble, whereby providing a soybean protein fraction whose 11S globulin-rich fraction (whose ratio of 11S globulin/(11S globulin+7S globulin) is 0.7 or higher) with a reduced amount of the oil-body-associated proteins contains the oil-body-associated proteins in an amount of 20%/total proteins or less, i.e., contains the polar lipids extractable with chloroform:methanol (2:1) in an amount of 2% or less.

Each of the both fractions described above can further be subjected to a phytate cleavage by a phytase to give a phytate-reduced protein fraction whose phytate is as low as 1.2% or less based on the resultant protein. The time when the phytase treatment is accomplished for the purpose of raising the fractionation efficiency is preferably any time before the fractionation.

DETAILED DESCRIPTION OF THE PREFERRED EMBODIMENTS

Figure 1:
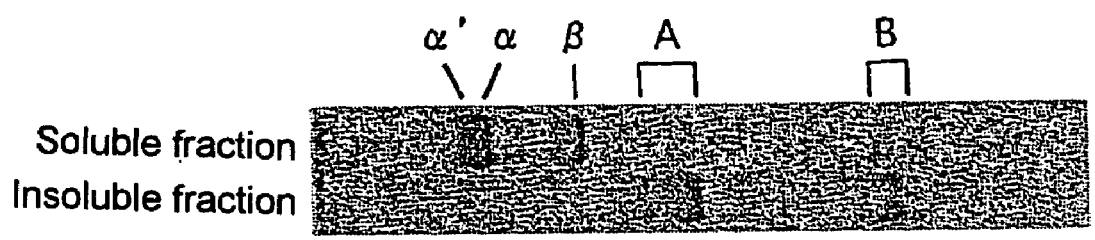
FIG. 1 shows the SDS polyacrylamide gel electrophoresis patterns of a soluble fraction and an insoluble fraction obtained by warming at 60° C. at pH 4.8.

Analytical methods employed in the present invention are described below.

Crude protein; Based on a Kjeldahl method, a nitrogen content was determined and multiplied by the coefficient 6.25 to convert into a crude protein.

SDS-Polyacrylamide electrophoresis; Based on a method by Laemmli (Nature, 227, 680 (1970)), an analysis was conducted with a gradient gel concentration from 10 to 20%. The amount of a sample applied was 10 μg.

Phytate; A method by Alii Mohamed (Cereal Chemistry 63, 475–478, 1986) was employed.

Chloroform methanol-extractable oil fraction; A dried sample was combined with an about 50-fold volume of a mixture of chloroform and methanol (2:1, v/v) and the weight ratio of the solids extracted by reflux was determined as a chloroform-methanol-extractable oil portion.

Purity (SPE standard); The pattern of the bands obtained in the SDS-polyacrylamide electrophoresis described above was measured by a densitometer and a % area of the corresponding band based on the total area was represented as a purity (on basis of SPE). A 7S globulin content mentioned here means the total amount of α, α' and β subunits, while an 11S globulin content means the total amount of acidic polypeptides (A) and basic polypeptides (B).

Corrected purity; Based on a purity (on basis of SPE) obtained above and taking any contaminating oil-body-associated proteins, a corrected purity was calculated as described below. Thus, a purity of a sample (on basis of SPE) is represented as A %, and a purity is calculated as a value based on the total proteins including the 7S globulin, the 11S globulins and the oil-body-associated proteins, since the sample contains the oil-body-associated proteins in an amount 10 times the weight of the chloroform methanol-extractable oil portion in addition to the 7S globulin and the 11 S globulin.

Corrected purity (%)=(100 (%)–
chloroform-methanol-extractable oil portion
(%)*10)*A (%)/100

Preferred embodiments of the present invention are described below.

A starting soybean employed in the present invention may be any commercial soybean or a soybean having a defect of a certain fraction which was obtained by a breeding or a gene engineering or the like.

A solution containing a soybean protein may be a hydrated soybean slurry or a soybean milk obtained therefrom, and those employed more preferably are a hydrated defatted soybean slurry or a defatted soybean milk obtained therefrom as well as an acid-precipitated soybean protein slurry or a separated soybean protein solution.

For fractionating into a 7S globulin-rich fraction and an 11S globulin-rich fraction according to the present invention, a non-modified or a low-modified soybean protein solution is preferred. When a soybean protein solution is warmed under a weakly acidic condition at pH 3.8 to 6.8, preferably pH 4.0 to 6.6, more preferably pH 4.2 to 6.2 at a temperature of 30 to 75° C., preferably 35 to 65° C., more preferably 40 to 60° C., and then adjusted at pH 5.6 to 6.6, preferably pH 5.6 to 6.4, a separation into a 7S globulin-rich soluble fraction and a 11S globulin-rich insoluble fraction can readily be accomplished. In any step during the manufacturing process especially before a fractionation into a soluble fraction and an insoluble fraction, phytate coexisting with the soybean protein are cleaved by a phytase, whereby effecting a separation into a 7S globulin-rich fraction and an 11S globulin-rich fraction more easily. It is convenient to conduct a phytase treatment simultaneously with warming. A phytase is employed usually at pH 3.5 to 9.0 at a temperature of 20 to 70° C. for a period of 5 minutes to 3 hours at a concentration of 0.1 to 100 units/weight (g) protein, although the condition may vary depending on the origin of the phytase. The activity of 1 unit of a phytase corresponds to the amount of the enzyme for cleaving 1µ mole of phosphate from phytate within 1 minutes at an early stage of a reaction at pH 5.5 and 37° C.

Unlike to the pH and the temperature in the warming step described above, the length of the duration of the warming or the presence or absence of any reducing agent has no serious effect on the difficulty experienced in a separation process, and thus is of a less significance. A pH departing out of the range from pH 3.8 to 6.8 or a temperature out of the range from 30° C. to 75° C. in the warming step may lead to a difficulty in separating into a 7S globulin and a 11S globulin. A pH upon separation less than 5.6 may undesirably lead to an increase in the amount of a 7S globulin migrated into an insoluble fraction, while a pH exceeding 6.6 may undesirably lead to an increase in the amount of a 11S globulin migrated into a soluble fraction.

After the warming step, a fractionation may be performed at the same temperature, although it is preferable to ensure a cooling for controlling any microbes. The fractionation may be accomplished by using a known separation procedure (such as filtration and centrifugation), and an easy separation can also be accomplished especially by using a continuous centrifuge (such as a decanter). It is a matter of course that the use of a non-continuous centrifuge such as a batch centrifuge is not excluded.

The state of the fractionation into a 7S globulin-rich fraction as a soluble fraction and a 11S globulin-rich fraction as an insoluble fraction according to the present invention can be verified on the basis of a pattern obtained in an SDS polyacrylamide gel electrophoresis (purity (on basis of SPE)).

Nevertheless, a purity on the basis of SPE allows the oil-body-associated proteins to be underestimated due to a poor staining in an SDS polyacrylamide gel electrophoresis, a corrected purity represented above by the formula:corrected purity (%)=(100 (%)–chloroform methanol-extractable oil portion (%)* 10)* A (%)/100 is considered to be closer to the actual purity.

A soluble fraction after the separation can be employed as a 7S globulin-rich fraction directly or after concentration, neutralization, sterilization or drying. The concentration may be effected for example by shifting the pH of the soluble fraction closer to an isoelectric point (pH 4.5 to 5.3, preferably pH 4.7 to 5.1) and then recovering the precipitating curd, followed usually by neutralization, heat sterilization and then drying. The heat sterilization may employ known HTST, UHT and the like. Depending on the purpose, the enzyme treatment for example with a protease may be effected in the state of a solution.

From an insoluble fraction after separation, an 11S globulin component is extracted using an approximately neutral aqueous solution (pH 6.5 to 8.5), whereby isolating from an insoluble oil-body-associated proteins (as well as a lee component, if any, in the insoluble fraction). In this step, the separation between a 11S globulin and the oil-body-associated proteins can be effected preferably by using a high-G centrifuge of about 4000 G or higher, preferably about 5000 G or higher, whereby obtaining a protein whose chloroform-methanol-extractable oil portion content is 2% or lower in the solid while maintaining a ratio of 11S globulin/(11S globulin+7S globulin) of 0.7 or higher.

An 11S globulin-containing solution thus obtained can be employed as an 11S globulin-rich soybean protein directly or after concentration, neutralization or drying. The concentration may be effected for example by subjecting a soluble fraction to an isoelectric precipitation (pH 4.5 to 5.8, preferably pH 4.7 to 5.5) and recover the precipitated curd, which is preferable for the purpose of improving the physical characteristics, while it is also possible that the isoelectric precipitation is followed by neutralization, heat sterilization or enzymatic treatment for example with a protease. A sterilized and dried form is a most common form. The heat sterilization may employ known HTST, UHT and the like.

The present invention is further described in the following examples. However, these Examples are not intended to restrict the technical scope of the present invention.

EXAMPLES

The present invention is further described in the following examples, which are not intended to restrict the technical scope of the present invention.

Example 1

A soybean was crushed flat and extracted with n-hexane to remove oils, and 1 part by weight of the resultant low-modified defatted soybean (nitrogen soluble index NSI: 91) was combined with 10 parts by weight of extracting water, and extracted at room temperature and at pH 7.0 for 1 hour and then centrifuged to obtain a defatted soybean milk. This defatted soybean milk was adjusted at pH 3.6 to 7.0 with hydrochloric acid and subjected to the next step with or without warming at 80° C. or lower. Immediately after this pH-adjusted defatted soybean milk reached a certain temperature, it was cooled to about 30° C., adjusted at pH 5.8 and centrifuged by a batch centrifuge (3000G) to separate a 7S globulin-containing soluble fraction and a 11S globulin-containing insoluble fraction. The temperature of each solution during this centrifugation was about 25° C. As a result of the observation of the state of the separation between the soluble and insoluble fractions of the soybean milk within the ranges of the pH and the warming conditions described above, it was revealed that a discrete separation between the soluble and insoluble fractions was obtained by warming at 30° C. or higher, preferably 35° C. or higher, more preferably 40° C. or higher under an acidic condition of pH 3.8 to 6.8, preferably pH 4.0 to 6.6, more preferably pH 4.2 to 6.2. Nevertheless, the results of an SDS polyacrylamide gel electrophoresis of the protein compositions of the soluble and insoluble fractions after centrifugation revealed that the heat treatment at 70° C. allowed the 7S globulin to begin the migration into the insoluble fraction and the heat treatment at 80° C. allowed almost all 7S globulin to be contained in the insoluble fraction, indicating the unsuccessful fractionation between 7S and 11S globulins.

Based on the results described above, it was revealed that a convenient separation between a 7S globulin-containing soluble fraction and a 11S globulin-containing insoluble fraction can be accomplished by warming at 30° C. to 75° C., preferably 35° C. to 65° C., more preferably 40° C. to 60° C. under an acidic condition of pH 3.8 to 6.8, preferably pH 4.0 to 6.6, more preferably pH 4.2 to 6.2 followed by centrifugation at pH 5.8.

FIG. 1 shows the SDS polyacrylamide gel electrophoresis patterns of the soluble fraction and the insoluble fraction obtained by warming at 60° C. at pH 4.8 among the warming conditions specified above.

The ratios of the 7S globulin and the 11S globulin present in the soluble fraction and the insoluble fraction after the separation described above (area ratio of an SDS polyacrylamide gel electrophoresis pattern determined by a densitometry, the same applies analogously hereinafter) are shown in table 1.

TABLE 1

| (warming at 60° C. at pH 4.8) | | |
|---|---|---|
| | Soluble fraction | Insoluble fraction |
| 7S:11S | 95:5 | 7:93 |

The chloroform methanol-extractable oil portion in each solid of the soluble and insoluble fractions are obtained 0.9% and 3.2%, respectively, which verified that the oil-body-associated proteins was concentrated into the insoluble fraction.

Example 2

One Part by weight of the low-modified defatted soybean which was defatted similarly to example 1 was combined with 10 parts by weight of extracting water, and extracted at room temperature to 80° C. at pH 3.6 to 7.2 for 30 minutes to obtain a slurry. This extracted slurry was cooled to approximately room temperature, it was adjusted at pH 5.8 with hydrochloric acid or sodium hydroxide, and centrifuged by a batch centrifuge (3000G) to separate a 7S globulin-containing soluble fraction and a 11S globulin-containing insoluble fraction. The temperature of each solution during the centrifugation was about 25° C. As a result of the observation of the state of the separation between the soluble and insoluble fractions of the slurry within the ranges of the extraction temperature and the pH described above, it was revealed that a discrete separation between the soluble and insoluble fractions was obtained by warming at 30° C. or higher, preferably 35° C. or higher, more preferably 40° C. or higher under an acidic condition of pH 3.8 to 6.8, preferably pH 4.0 to 6.6, more preferably pH 4.2 to 6.2. Nevertheless, the results of an SDS polyacrylamide gel electrophoresis of the protein compositions of the soluble and insoluble fractions after centrifugation verified that the heat treatment at 70° C. allowed the 7S globulin to begin the migration into the insoluble fraction and the heat treatment at 80° C. or higher allowed almost all 7S globulin to be contained in the insoluble fraction, indicating the unsuccessful fractionation between 7S and 11S globulins.

Based on these results, it was revealed that a convenient separation between a 7S globulin-containing soluble fraction and a 11S globulin-containing insoluble fraction can be accomplished by extraction at 30° C. to 75° C., preferably 35° C. to 65° C., more preferably 40° C. to 60° C. under an acidic condition of pH 3.8 to 6.8, preferably pH 4.0 to 6.6, more preferably pH 4.2 to 6.2 followed by centrifugation at pH 5.8.

The ratios of the 7S globulin and the 11S globulin present in the soluble fraction and the insoluble fraction after extraction at pH 5.3 and at 40° C. were calculated similarly to example 1, and are shown in table 2.

TABLE 2

| (extraction at pH 5.3 at 40° C.) | | |
|---|---|---|
| | Soluble fraction | Insoluble fraction |
| 7S:11S | 96:4 | 8:92 |

The chloroform methanol-extractable oil portion in each solid of the soluble and insoluble fractions obtained are 0.8% and 3.0%, respectively, which verified that the oil-body-associated proteins was concentrated into the insoluble fraction.

Based on the results of examples 1 and 2, it was revealed that a step of a heat treatment under an acidic condition enables a separation of a 7S globulin-containing soluble fraction and an insoluble fraction containing a 11S globulin and the oil-body-associated proteins from a solution containing a soybean protein by means of a low centrifugal force which is employed industrially.

Example 3

A defatted soybean milk extracted similarly to example 1 was adjusted at pH 4.8 with hydrochloric acid and then warmed to 50° C. Immediately after the pH-adjusted defatted soybean milk reached 50° C. and also after it was kept at 50° C. for 60 minutes, it was cooled to about 30° C., adjusted at pH 5.8 with sodium hydroxide and centrifuged by a batch centrifuge (3000G). In this procedure, a discrete separation between a soluble fraction and an insoluble fraction was observed regardless of the keeping periods. The temperature of the solution during this centrifugation was about 25° C.

The ratios of the 7S globulin and the 11S globulin present in the soluble fraction and the insoluble fraction thus obtained were calculated similarly to example 1, and are shown in tables 3 and 4.

TABLE 3

(without keeping at 50° C.)

|  | Soluble fraction | Insoluble fraction |
| --- | --- | --- |
| 7S:11S | 95:5 | 7:93 |

TABLE 4

(with keeping at 50° C. for 60 minutes)

|  | Soluble fraction | Insoluble fraction |
| --- | --- | --- |
| 7S:11S | 93:7 | 8:92 |

Based on these results, there was no keeping period-dependent mutual contamination between the 7S globulin and the 11S globulin, revealing that the warming and keeping period under an acidic condition may not particularly be limited.

Example 4

A defatted soybean milk extracted similarly to Example 1 was adjusted at pH 4.8 with hydrochloric acid and then warmed to 50° C. Immediately after the pH-adjusted defatted soybean milk reached 50° C., it was cooled to about 30° C., adjusted at pH 5.7 and pH 6.0 with sodium hydroxide and centrifuged by a batch centrifuge (3000G). As a result, a discrete separation between a soluble fraction and an insoluble fraction was observed. The temperature of the solution during this centrifugation was about 25° C.

The ratios of the 7S globulin and the 11S globulin present in the soluble fraction and the insoluble fraction thus obtained were calculated similarly to example 1, and are shown in tables 5 and 6.

TABLE 5

(separation at pH 5.7)

|  | Soluble fraction | Insoluble fraction |
| --- | --- | --- |
| 7S:11S | 92:8 | 8:92 |

TABLE 6

(separation at pH 6.0)

|  | Soluble fraction | Insoluble fraction |
| --- | --- | --- |
| 7S:11S | 83:17 | 5:95 |

Based on these results, the pH upon centrifugation, i.e., the pH at which the 7S globulin-containing soluble fraction and the 11S globulin-containing insoluble fraction were separated may vary to some extent.

Example 5

A defatted soybean milk extracted similarly to Example 1 was adjusted at pH 4.8 with hydrochloric acid and then warmed to 50° C. Immediately after the pH-adjusted defatted soybean milk reached 50° C., it was cooled to about 30° C., adjusted at pH 5.8 with sodium hydroxide and centrifuged by a batch centrifuge (3000G). As a result, a discrete separation between a soluble fraction and an insoluble fraction was observed. The temperature of the solution during this centrifugation was about 25° C. The resultant insoluble fraction was hydrated (2-fold weight), neutralized at pH 7.0 with sodium hydroxide, subjected to a defining using a high G centrifugation (5000G, 10 minutes) to obtain a 11S globulin-rich supernatant. On the other hand, the soluble fraction was adjusted at pH 4.9 with hydrochloric acid, centrifuged (3000G, 5 minutes) to remove a whey, whereby obtaining a precipitated curd. The precipitated curd was hydrated (4-fold weight) and neutralized with sodium hydroxide to obtain a 7S globulin-rich fraction.

Each fraction was sterilized at 140° C. for 15 seconds and spray-dried to obtain 2 powder formulations which were 7S globulin-rich and 11S globulin-rich fractionated soybean proteins. The compositions of the 7S globulin and the 11S globulin thus obtained are shown in Table 7.

TABLE 7

|  | 7S Globulin | 11S Globulin |
| --- | --- | --- |
| Water | 5.0% | 5.0% |
| Crude proteins (dried basis) | 97.8% | 96.8% |
| Purity (SPE standard) | 94.8% | 92.2% |
| Chloroform methanol-extractable oil portion | 0.8% | 2.0% |
| Phytate | 2.1% | 2.0% |
| Corrected purity | 87.2% | 73.8% |

Based on the results described above, it was revealed that highly pure 7S and 11S, each containing a reduced amount of chloroform methanol-extractable oil portion were obtained from a defatted soybean milk as a starting material.

Example 6

A defatted soybean milk extracted similarly to Example 1 was adjusted at pH 4.5 with hydrochloric acid and centrifuged by a batch centrifuge (2000G) to separate an insoluble fraction (hereinafter referred to as acid-precipitated curd) and a soluble fraction (whey). The acid-precipitated curd (i.e., separated soybean protein) was combined with water and dispersed sufficiently, and then warmed to 50° C. Immediately after the acid-precipitated curd dispersion reached 50° C., it was cooled to about 30° C., adjusted at pH 5.8 with sodium hydroxide and centrifuged by a batch centrifuge (3000G). As a result, a discrete separation between a soluble fraction and an insoluble fraction was observed. The temperature of the solution during this centrifugation was about 25° C. The resultant insoluble fraction was hydrated (2-fold weight) and neutralized with sodium hydroxide. On the other hand, the soluble fraction was adjusted at pH 4.9 with hydrochloric acid, centrifuged to remove a whey, whereby obtaining an acid-precipitated curd. The precipitated curd was hydrated (4-fold weight) and neutralized with sodium hydroxide. Each neutralized fraction was sterilized at 140° C. for 15 seconds and spray-dried to obtain 2 powder formulations which were 7S globulin-rich and 11S globulin-rich fractionated soybean proteins.

The ratios of the 7S globulin and the 11S globulin present in the soluble fraction and the insoluble fraction obtained after the separation described above were calculated similarly to example 1, and are shown in table 8.

TABLE 8

|  | Soluble fraction | Insoluble fraction |
|---|---|---|
| 7S:11S | 96:4 | 10:90 |

Based on these results, it was revealed that a step of a heat treatment under an acidic condition enables a highly accurate separation of a 7S globulin-rich soluble fraction and an 11S globulin-rich insoluble fraction even when using an acid-precipitated curd (separated soybean protein) as a soybean protein solution to be fractionated.

Example 7

A defatted soybean milk extracted similarly to Example 1 was adjusted at pH 6.2 with hydrochloric acid and warmed to 40° C. This solution (phytate content 2.20%/weight protein, determined in accordance with a method by Alii Mohamed (Cereal Chemistry 63, 475–478, 1986)) was combined with 8 units/weight protein (the activity of 1 unit of a phytase corresponds to the amount of the enzyme for cleaving 1µ mole of phosphate from phytate within 1 minutes at an early stage of a reaction at pH 5.5 and 37° C.) of a phytase (NOVO, PHYTASE NOVO L) and reacted enzymatically for 30 minutes. After reaction (phytate content:0.05%/weight protein), the pH was adjusted at 4.8 with hydrochloric acid, and the temperature was raised to 50° C. by warming. Immediately after the pH-adjusted phytase-treated solution reached 50° C., it was cooled to about 30° C., adjusted at pH 6.2 with sodium hydroxide and centrifuged by a batch centrifuge (3000G). As a result, a discrete separation between a soluble fraction and an insoluble fraction was observed.

The temperature of the solution during this centrifugation was about 25°. The resultant insoluble fraction was hydrated (2-fold weight) and neutralized with sodium hydroxide. On the other hand, the soluble fraction was adjusted at pH 4.9 with hydrochloric acid, centrifuged to remove a whey, whereby obtaining an acid-precipitated curd. The precipitated curd was hydrated (4-fold weight) and neutralized with sodium hydroxide. Each neutralized fraction was sterilized at 140° C. for 15 seconds and spray-dried to obtain 2 powder formulations which were 7S globulin-rich and 11S globulin-rich fractionated soybean proteins.

The ratios of the 7S globulin and the 11S globulin present in the soluble fraction and the insoluble fraction obtained after the separation described above which were calculated similarly to example 1 and the phytate contents per dried sample weight are shown in table 9.

TABLE 9

|  | Soluble fraction | Insoluble fraction |
|---|---|---|
| 7S:11S | 95:5 | 8:92 |
| Phytate | 0.05% | 0.05% |

Based on these results, it was revealed that a step of a heat treatment under an acidic condition enables a highly accurate separation of a 7S globulin-rich soluble fraction and an 11S globulin-rich insoluble fraction even when using a soybean protein solution whose phytate has been cleaved by a phytase.

Example 8

A defatted soybean milk extracted similarly to example 1 was divided into two samples A and B. Sample A was adjusted at pH 4.8 with hydrochloric acid and then warmed to 50° C. Immediately after the pH-adjusted defatted soybean milk reached 50° C., it was cooled to about 45° C., adjusted at pH 5.8 with sodium hydroxide and centrifuged by a batch centrifuge (3000G). As a result, a discrete separation between a soluble fraction and an insoluble fraction was observed. The temperature of the solution during this centrifugation was about 40° C. The resultant soluble fraction was warmed to 40° C., divided into two samples A-1 and A-2, and Sample A-1 was combined with 8 units/weight protein of a phytase (NOVO, "PHYTASE NOVO L") and reacted enzymatically for 30 minutes. After reaction, each of Samples A-1 and A-2 was adjusted at pH 4.9 with hydrochloric acid and centrifuged (3000G, 5 minutes) to remove a whey fraction to obtain a precipitated curd. The precipitated curd was hydrated (4-fold weight) and neutralized at pH 7.0 with sodium hydroxide. Each neutralized fraction was sterilized at 140° C. for 15 seconds and spray-dried to obtain a phytase-treated purified 7S globulin fraction and a non-phytase-treated purified 7S globulin fraction (A-1, A-2).

On the other hand, Sample B was adjusted at pH 6.4, allowed to stand at 4° C. overnight, centrifuged (5000G, 4° C., 10 minutes) to obtain a supernatant, which was adjusted at pH 4.5, centrifuged (3000G, 5 minutes) to obtain a precipitate, which was recovered as a cryoprecipitated 7S globulin.

This precipitate of the cryoprecipitated 7S globulin was combined with a 4-fold volume of water, adjusted at pH 6.0, and then divided into two samples B-1 and B-2. Sample B-1 was combined with 8 units/weight protein of a phytase (NOVO, PHYTASE NOVO L) and reacted enzymatically for 30 minutes. After reaction, each of Samples B-1 and B-2 was adjusted at pH 4.9 with hydrochloric acid and centrifuged (3000G, 5 minutes) to remove a whey fraction to obtain a precipitated curd. The precipitated curd was hydrated and neutralized at pH 7.0 with sodium hydroxide, sterilized and spray-dried to obtain a phytase-treated cryoprecipitated 7S globulin fraction and a non-phytase-treated cryoprecipitated 7S globulin fraction (B-1, B-2).

The composition of each sample is shown in Table 10.

TABLE 10

|  | Purified 7S globulin | | Cryoprecipitated 7S globulin | |
| --- | --- | --- | --- | --- |
|  | A-1 | A-2 | B-1 | B-2 |
| Water | 4.8% | 4.7% | 4.7% | 4.9% |
| Crude proteins | 98.1% | 98.0% | 97.2% | 97.2% |
| Purity (SPE standard) | 97.1% | 97.1% | 78.2% | 78.3% |
| Chloroform · methanol-extractable oil portion | 0.7% | 0.7% | 2.8% | 2.8% |
| Phytate | 0.06% | 1.9% | 0.07% | 2.0% |
| Corrected purity | 90.3% | 90.3% | 56.3% | 56.3% |

A crude protein is on the dried basis.

Based on these results, it was revealed that the phytase treatment had no effect on the presence of the oil-body-associated proteins. While the cryoprecipitated 7S globulin exhibited an SDS polyacrylamide gel electrophoresis-based purity (SPE standard) as high as 80%, its corrected purity taking the oil-body-associated proteins into account was as low as about 60%, indicating a high purity of the 7S globulin according to the present invention.

Example 9

An acid-precipitated curd prepared similarly to Example 6 was combined with water and dispersed sufficiently, adjusted at pH 5.0 with sodium hydroxide, and warmed to 40° C.

This acid-precipitated curd dispersion was combined with 8 units/weight protein of a phytase (NOVO, "PHYTASE NOVO L") and reacted enzymatically for 30 minutes. Immediately after reaction, the sample was cooled to about 30° C., adjusted at pH 6.0 with sodium hydroxide and centrifuged by a batch centrifuge (3000G). As a result, a discrete separation between a soluble fraction and an insoluble fraction was observed. The temperature of the solution during this centrifugation was about 25° C. The resultant insoluble fraction was hydrated (2-fold weight) and neutralized with sodium hydroxide. On the other hand, the soluble fraction was adjusted at pH 4.9 with hydrochloric acid, centrifuged to remove a whey, whereby obtaining an acid-precipitated curd. The precipitated curd was hydrated (4-fold weight) and neutralized with sodium hydroxide. Each neutralized fraction was sterilized at 140° C. for 15 seconds and spray-dried to obtain 2 formulations which were phytase-treated 7S globulin-rich and 11S globulin-rich fractionated soybean proteins.

The ratios of the 7S globulin and the 11S globulin present in the soluble fraction and the insoluble fraction obtained after the separation described above which were calculated similarly to example 1 and the phytate contents per dried sample weight are shown in table 11.

TABLE 11

|  | Soluble fraction | Insoluble fraction |
| --- | --- | --- |
| 7S:11S | 94:6 | 7:93 |
| Phytate | 0.06% | 0.07% |

Example 10

One part by weight of the low-modified defatted soybean which was defatted similarly to Example 1 was combined with 10 parts by weight of extracting water at 40° C., and adjusted at pH 5.3 with hydrochloric acid. This solution was combined with 8 units/weight protein of a phytase (NOVO, PHYTASE NOVO L) and subjected to a 30-minute treatment at 40° C. involving both of the protein extraction and the enzymatic reaction, whereby obtaining an enzyme-treated slurry extract. This enzyme-treated slurry extract was cooled to about 25° C., adjusted at pH 6.1 with hydrochloric acid, and centrifuged by a batch centrifuge (3000G). As a result, a discrete separation between a soluble fraction and an insoluble fraction was observed. The temperature of the solution during this centrifugation was about 25° C.

The resultant insoluble fraction was hydrated (7 times the amount of defatted soybean), adjusted at pH 7.2 with sodium hydroxide, extracted for 30 minutes, centrifuge to remove the insoluble fraction, whereby obtaining a 11S globulin-rich supernatant. An aliquot of the supernatant was subjected to a defining using a high G centrifugation (5000G, 10 minutes) to obtain a more clarified supernatant. The resultant 11S globulin-rich supernatant was adjusted at pH 5.0 with hydrochloric acid, centrifuged to obtain a precipitated curd. The precipitated curd was hydrated (4-fold weight), neutralized with sodium hydroxide, sterilized at 140° C. for 15 seconds and spray-dried to obtain a phytase-treated 11S globulin-rich fractionated soybean protein.

On the other hand, the soluble fraction was adjusted at pH 4.9 with hydrochloric acid and centrifuged to obtain a precipitated curd. The precipitated curd was washed with a 10-fold volume of water, hydrated (4-fold weight), neutralized with sodium hydroxide, sterilized at 140° C. for 15 seconds and immediately spray-dried to obtain a phytase-treated 7S globulin-rich fractionated soybean protein.

The ratios of the 7S globulin and the 11S globulin present in the soluble fraction and the insoluble fraction obtained after the separation described above which were calculated similarly to example 1 and the phytate contents are shown in table 12.

TABLE 12

|  | Soluble fraction | Insoluble fraction |
| --- | --- | --- |
| 7S:11S | 94:6 | 7:93 |
| Phytate | 0.06% | 0.09% |

The powder compositions of the 7S globulin-rich protein (7S in Table), the 11S globulin-rich protein (11S in table) and a commercial separated protein ("FUJIPRO-F", SPI in table) as a reference control are shown in table 13.

TABLE 13

|  | Water (%) | Crude protein (%) | 7S/11S ratio | Phytate (%) | Chloroform · methanol-extractable oil portion (%) |
| --- | --- | --- | --- | --- | --- |
| 7S | 4.3 | 98.2 | 95/5 | 0.06 | 0.7 |
| 11S (Non-defining) | 5.5 | 94.3 | 4/96 | 0.09 | 2.8 |
| 11S (Defining) | 4.8 | 98.2 | 4/96 | 0.09 | 1.8 |
| SPI | 5.5 | 90.2 | 30/70 | 1.8 | 3.5 |

A crude protein is on the dried basis.

The 7S globulin-rich protein was examined for its amino acid composition, and the results indicated that the sulfur-containing amino acid content of methionine+cysteine was 12 mg/g protein. While a poorly pure 7S globulin such as a trypsin inhibitor frequently has a sulfur-containing amino acid content of 15 mg/g or higher because of the contamination with protein fractions containing a large amount of sulfur-containing amino acids unlike to a completely purified 7S globulin whose typical sulfur-containing amino acid content is 5 mg/g, a low sulfur-containing amino acid content of the invention further supports the high purity of the present inventive 7S globulin.

Example 11

One part by weight of the low-modified defatted soybean which was defatted similarly to Example 1 was combined with 10 parts by weight of extracting water at 40° C., and adjusted at pH 6.1 with hydrochloric acid. This solution was combined with 8 units/weight protein of a phytase (NOVO, "PHYTASE NOVO L") and subjected to a 30-minute treatment at 40° C. involving both of the protein extraction and the enzymatic reaction, whereby obtaining an enzyme-treated slurry extract. This enzyme-treated slurry extract was cooled to about 25° C., adjusted at pH 6.1 with sodium hydroxide, and centrifuged by a batch centrifuge (3000G). As a result, a discrete separation between a soluble fraction and an insoluble fraction was observed. The temperature of the solution during this centrifugation was about 25° C. The resultant insoluble fraction was hydrated (7 times the amount of defatted soybean), adjusted at pH 7.2 with sodium hydroxide, extracted for 30 minutes, centrifuge to remove the insoluble fraction, whereby obtaining a 11S globulin-rich supernatant. The resultant 11S globulin-rich supernatant was adjusted at pH 5.0 with hydrochloric acid and centrifuged to obtain a precipitated curd. The precipitated curd was hydrated (4-fold weight), neutralized with sodium hydroxide, sterilized at 140° C. for 15 seconds and spray-dried to obtain a phytase-treated 11S globulin-rich fractionated soybean protein. On the other hand, the soluble fraction was adjusted at pH 4.9 with hydrochloric acid and centrifuged to obtain a precipitated curd. The precipitated curd was hydrated (4-fold weight), neutralized with sodium hydroxide, sterilized at 140° C. for 15 seconds and spray-dried to obtain a phytase-treated 7S globulin-rich fractionated soybean protein.

The ratios of the 7S globulin and the 11S globulin present in the soluble fraction and the insoluble fraction obtained after the separation described above which were calculated similarly to Example 1 and the phytate contents in the sample solids are shown in Table 14.

TABLE 14

|  | Soluble fraction | Insoluble fraction |
| --- | --- | --- |
| 7S:11S | 89:11 | 7:93 |
| Phytate | 0.09% | 0.12% |

Example 12

A defatted soybean milk prepared similarly to Example 1 was adjusted at pH 5.0 with hydrochloric acid and then warmed to 40° C. This defatted soybean milk was kept at 40° C. for 30 minutes as it was or after being combined with 8 units/weight protein of a phytase (NOVO, "PHYTASE NOVO L"). After cooling to about 30° C., sodium hydroxide was added to adjust the non-treated solution at pH 5.8 and the phytase-treated solution at pH 6.0. One hundred g of each solution was centrifuged by a batch centrifuge (3000G). As a result, a discrete separation between a soluble fraction and an insoluble fraction was observed. The temperature of the solution during this centrifugation was about 25° C. The amount of the precipitation of each insoluble fraction isolated by the centrifugation described above is shown in Table 15.

TABLE 15

|  | Without phytase treatment | With phytase treatment |
| --- | --- | --- |
| Precipitation weight (g) | 12.2 | 10.6 |
| Solid (%) | 27.0 | 31.1 |
| Recovered solid (g) | 3.3 | 3.3 |

Example 13

An acid-precipitated curd prepared similarly to Example 6 was combined with water and dispersed sufficiently, adjusted at pH 5.0 with sodium hydroxide, and warmed to 40° C. This acid-precipitated curd was kept at 40° C. for 30 minutes as it was or after being combined with 8 units/weight protein of a phytase (NOVO, "PHYTASE NOVO L"). After cooling to about 30° C., sodium hydroxide was added to adjust the non-treated solution at pH 5.8 and the phytase-treated solution at pH 6.0. Each curd slurry was adjusted at the concentration of 5% and centrifuged by a batch centrifuge (3000G). As a result, a discrete separation between a soluble fraction and an insoluble fraction was observed. The temperature of the solution during this centrifugation was about 25° C.

The amount of the precipitation of each insoluble fraction isolated by the centrifugation described above is shown in Table 16.

TABLE 16

|  | Without phytase treatment | With phytase treatment |
| --- | --- | --- |
| Precipitation weight (g) | 15.5 | 13.5 |
| Solid (%) | 26.5 | 30.4 |
| Recovered solid (g) | 4.1 | 4.1 |

Based on the results of Examples 12 and 13, a phytate cleavage using a phytase provides a high dehydrating rate of the insoluble fraction upon separation of the 7S globulin-containing soluble fraction and the 11S globulin-containing insoluble fraction, thus allowing the separation to be conducted more easily.

Comparative Example 1

A defatted soybean milk extracted similarly to Example 1 was boiled on a boiling water bath for 10 minutes. After cooling with water, the sample was adjusted at pH 4.8 with hydrochloric acid, and warmed at 50° C. Immediately after the pH-adjusted defatted soybean milk reached 50° C., it was cooled to about 30° C., adjusted at pH 5.8 and centrifuged by a batch centrifuge (3000G), but no discrete separation between a soluble fraction and an insoluble fraction was observed. Accordingly, the sample was centrifuged by a batch centrifuge at 8000G to obtain an insoluble fraction and a soluble fraction. However, the resultant soluble fraction had a % protein recovery as low as 30.3%, and its composition determined by an SDS polyacrylamide gel electrophoresis revealed that almost no 7S globulin was contained.

Based on these results, it was found that a heating prior to a heating under an acidic condition had a marked adverse effect on the separation.

(Dissolution Profile of Fractionated Soybean Protein)

Four fractionated soybean proteins consisting of the non-phytate-cleaved 7S and 11S globulins obtained in example 6 and the phytate-cleaved 7S and 11S globulins obtained in example 9 were examined relatively for their dissolution profiles.

The dissolution profile was evaluated based on the proportion of the proteins contained in a soluble fraction obtained by centrifugation at 9000G based on the total proteins in a 1% fractionated soybean protein solution adjusted at pH 1 with hydrochloric acid. The preparation of a 1% solution, the pH adjustment and the centrifugation were performed at 25° C.

Figure 2:
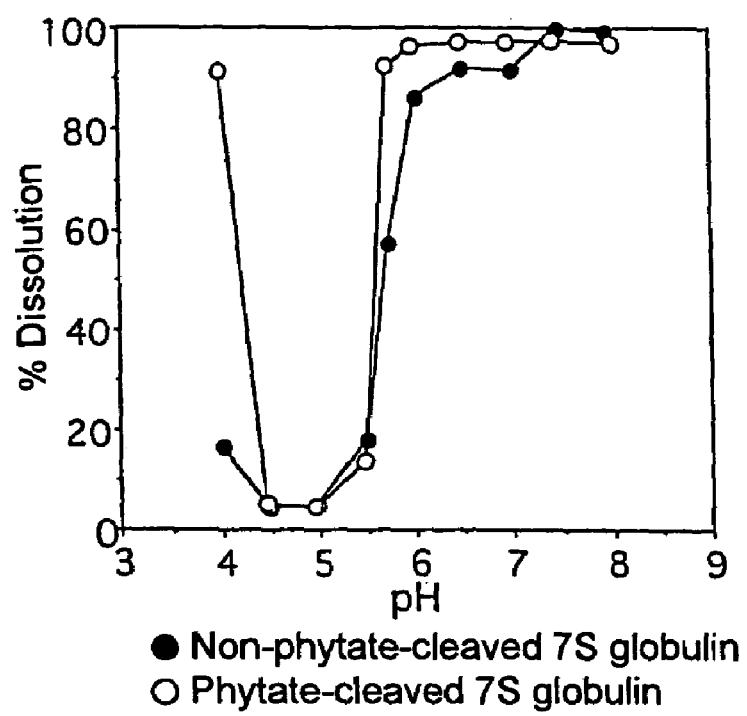
FIG. 2 shows the dissolution profile of a 7S globulin-rich protein obtained from a soluble fraction.
Figure 3:
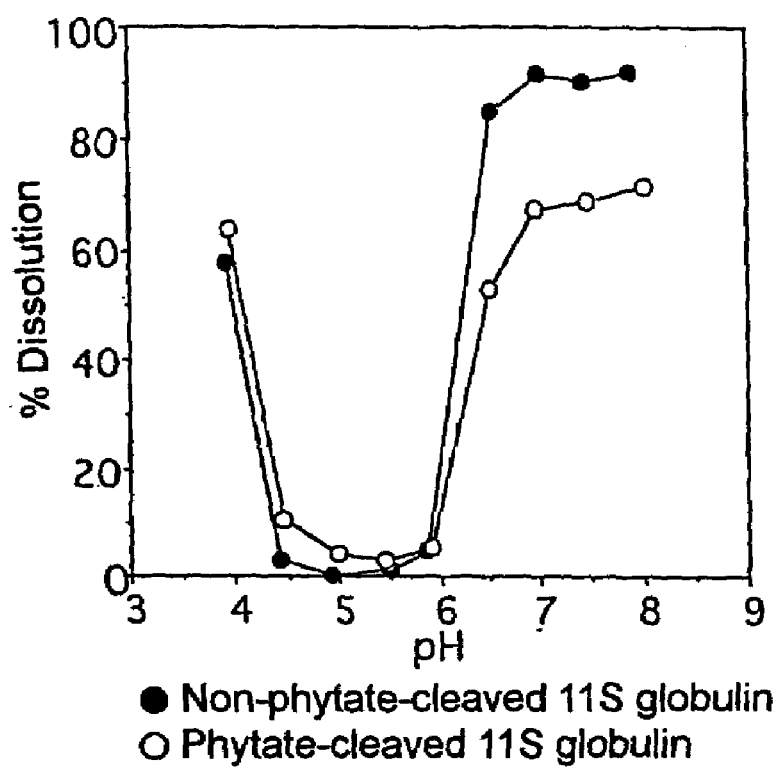
FIG. 3 shows the dissolution profile of a 11S globulin-rich protein obtained from an insoluble fraction.

FIGS. 2 and 3 show the dissolution profiles of the 7S globulin and the 11S globulin, respectively.

Based on these results, it was revealed that a phytate cleavage allowed the solubility of the 7S globulin at pH 4 or lower to be increased greatly while reducing the solubility of the 11S globulin at pH 6.5 or higher.

INDUSTRIAL APPLICABILITY

As mentioned above, the present invention involves warming a solution containing a soybean protein under a weakly acidic condition followed by fractionating at pH 5.6 to 6.6 into a soluble fraction and an insoluble fraction, which can be accomplished efficiently in an industrial scale.

What is claimed is:

1. A method for producing a fractionated soybean protein which comprises warming a solution containing a soybean protein at a temperature of 30 to 75° C. under a weakly acidic condition followed by fractionating at pH5.6 to 6.6 into a soluble fraction and an insoluble fraction without phytase treatment before fractionation.

2. The method according to claim 1, wherein the weakly acidic condition is pH 3.8 to 5.8.

3. The method according to claim 1, wherein the soluble fraction contains 7S globulin in a ratio of 7S globulin/(11S globulin+7S globulin) of 0.4 or higher.

4. The method according to claim 1, wherein a polar lipid in a solid component of the soluble fraction which can be extracted with a 2:1 mixture of chloroform:methanol amounts to 1% or less.

5. The method according to claim 1, wherein the insoluble fraction contains 11S globulin in a ratio of 11S globulin/(11S globulin+7S globulin) of 0.7 or higher.

6. The method according to claim 1, wherein a 11S globulin in the insoluble fraction is extracted with an approximately neutral aqueous solution and then centrifuged to obtain an extracted fraction.

7. The method according to claim 6, wherein a polar lipid in a solid component of the extracted fraction which can be extracted with a 2:1 mixture of chloroform:methanol amounts to 2% or less.

8. A highly pure 7S globulin protein whose ratio of 7S globulin/(11S globulin+7S globulin) is 0.4 or higher and whose oil-body-associated proteins containing polar lipid in a solid component which can be extracted with a 2:1 mixture of chloroform:methanol amounts to 10% or less.

9. A highly pure 11S globulin protein whose ratio of 11S globulin/(11S globulin+7S globulin) is 0.7 or higher and whose oil-body-associated proteins containing polar lipid in a solid component which can be extracted with a 2:1 mixture of chloroform:methanol amounts to 20% or less.

* * * * *